United States Patent
Lee et al.

(10) Patent No.: US 12,101,197 B1
(45) Date of Patent: Sep. 24, 2024

(54) TEMPORARILY SUSPENDING SPATIAL CONSTRAINTS

(71) Applicant: Apple Inc., Cupertino, CA (US)

(72) Inventors: Kevin Lee, San Jose, CA (US); Connor A. Smith, San Mateo, CA (US); Luis R. Deliz Centeno, Oakland, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 17/854,335

(22) Filed: Jun. 30, 2022

Related U.S. Application Data

(60) Provisional application No. 63/218,690, filed on Jul. 6, 2021.

(51) Int. Cl.
*H04L 12/18* (2006.01)
*G06T 15/20* (2011.01)

(52) U.S. Cl.
CPC ........ *H04L 12/1822* (2013.01); *G06T 15/205* (2013.01)

(58) Field of Classification Search
CPC .......................... H04L 12/1822; G06T 15/205
See application file for complete search history.

(56) References Cited

U.S. PATENT DOCUMENTS

| | | | |
|---|---|---|---|
| 9,530,249 B2 | 12/2016 | Kawamoto et al. | |
| 10,353,526 B1 * | 7/2019 | Sample | G06F 3/044 |
| 10,678,323 B2 * | 6/2020 | Gibson | G06T 15/20 |
| 10,832,427 B1 * | 11/2020 | Eble | G02B 27/0093 |
| 10,978,019 B2 * | 4/2021 | Chen | G06F 3/147 |
| 2014/0176591 A1 * | 6/2014 | Klein | G09G 5/00 345/589 |
| 2018/0085670 A1 | 3/2018 | Short | |
| 2019/0310757 A1 * | 10/2019 | Lee | G06F 3/017 |
| 2020/0117267 A1 * | 4/2020 | Gibson | G06F 3/011 |
| 2020/0327860 A1 * | 10/2020 | Chen | G06F 3/012 |
| 2020/0330872 A1 | 10/2020 | Odagiri et al. | |

(Continued)

OTHER PUBLICATIONS

Buchholz et al., "Smart and Physically-Based Naviagation in 3D Geovirtual Enviroments", Ninth International Conference on Information Visualization, Jul. 6, 2005, IEEE Publishing.*

(Continued)

*Primary Examiner* — Todd L Barker
(74) *Attorney, Agent, or Firm* — Thompson Hine LLP

(57) ABSTRACT

Various implementations present a representation of a communication session involving multiple devices in different presentation modes based on spatial transforms between a physical environment and the representation of the communication session. For example, a representation of a communication session is presented based on the position of a first device within a first physical environment and a second spatial transform between the first physical environment and the representation of the communication session, in accordance with a determination to switch the first presentation mode to a second presentation mode. Then the representation of the communication session is presented based on the position of the first device within the first physical environment and the first spatial transform in accordance with a determination to switch the second presentation mode back to the first presentation mode.

16 Claims, 7 Drawing Sheets

(56) References Cited

U.S. PATENT DOCUMENTS

| | | | | |
|---|---|---|---|---|
| 2020/0388077 | A1* | 12/2020 | Ninan | H04N 21/8146 |
| 2021/0134039 | A1* | 5/2021 | Tan | G06F 3/0304 |
| 2021/0279953 | A1* | 9/2021 | Bouhnik | G06T 17/05 |
| 2022/0253126 | A1* | 8/2022 | Holland | G06F 3/017 |
| 2022/0254120 | A1* | 8/2022 | Berliner | G06F 3/14 |
| 2024/0031614 | A1* | 1/2024 | Brandt | H04N 21/8456 |

OTHER PUBLICATIONS

Narang et al., "Simulating Movement Interactions between Avatars & Agents in Virtual Worlds Using Human Motion Constraints", IEEE Conference on Virtual Reality and 3D User interfaces, Mar. 18, 2022, IEEE Publishing.*

Thanyadit et al., "Substituting Teleportation Visualization for Collaborative Virtual Enviroments" SUI '20: Proceedings of the 2020 ACM Symposium on Spatial User Interaction, Oct. 2020.*

Nova et al. "A Mobile Game to Explore the Use of Location Awareness on Collaboration", Jan. 2006.*

Piumsomboon et al., "On the Shoulder of the Giant: A Multi-Scale Mixed Reality Collabordation with 360 Video Sharing and Tangible Interaction", May 4, 2019.*

Chen et al., "Intelligent Third Person Control of 3D Avatar Motion" 2007, pp. 61-72, Springer-Verlag.*

Piumsomboon et al., "Mini-Me: An Adaptive Avatar for Mixed Reality Remote Collaboration", Apr. 21, 2018.*

Leung et al., "Realistic Video Avatar", 2012.*

Fadzli et al., "3D telepresence for remote collaboration in extended reality (xR) application", 2020.*

Polap et al., "Strengthening the perception of the virtual worlds in a virtual reality enviroment", Feb. 28, 2020.*

Schrader et al., "Toward Eye-Tracked Sideline Concussion Assessment in extended Reallty" ACM Symposium on Eye Tracking Research and Applications, May 2021, Article No. 7, pp. 1-11.*

"Photo mode in Far Cry 5"—Ubisoft Support; May 12, 2021, pp. 1-4.

* cited by examiner

TEMPORARILY SUSPENDING SPATIAL CONSTRAINTS

CROSS-REFERENCE TO RELATED APPLICATIONS

This Application claims the benefit of U.S. Provisional Application Ser. No. 63/218,690 filed Jul. 6, 2021, which is incorporated herein in its entirety.

TECHNICAL FIELD

The present disclosure generally relates to electronic devices that use sensors to provide views during communication sessions, including views that include representations of one or more of the users participating in the sessions.

BACKGROUND

Various techniques are used to represent the participants of communication sessions such as video conferences, interactive gaming sessions, and other interactive social experiences. For example, the participants may see realistic or unrealistic representations of the users (e.g., avatars) participating in the sessions. The user representations may be positioned based on and move according to spatial constraints utilizing a common coordinate system.

SUMMARY

Various implementations disclosed herein include devices, systems, and methods that provide a representation of at least a portion of a user (e.g., an avatar) within an extended reality (XR) experience during a communication session. The XR experience presents representations of multiple users during the communication session, where the positioning of each representation is based on spatial constraints. Spatial constraints (also referred to herein as spatial truth) refers to a requirement in an XR experience that relative positioning between content elements and their relative movement over time be the same for all users participating in a multi-user communication session. Spatial constraints may provide a natural and desirable experience in which consistent spatial positioning and movement lead to expected characteristics. For example, an XR environment may include a first user, a second user, and a virtual television in which the first user is facing and viewing the virtual television. Spatial constraints may ensure that the first user appears to be facing the virtual television to the second user, rather than facing another direction.

Certain implementations herein enable the temporary suspension of spatial constraints in certain circumstances. For example, based on a determination to temporarily suspend spatial truth for each user representation (e.g., a user desires a group selfie of each avatar, two users want to break away for a one-on-one direct messaging, etc.), the representations of the users may be temporarily repositioned closer to one another without regard to the spatial constraints for a limited time and then repositioned back in the original positions. For example, a user may be virtually teleported next to another user (e.g., to take a selfie) temporarily. In this example, both users have the same (consistent) view of the XR environment both before and after the teleportation. Before and after the suspension period, the users' physical environment coordinate systems are associated with a common coordinate system, e.g., a coordinate system of the XR environment. However, during the suspension period, the transform between one or both of the users' physical environment coordinate systems and the common coordinate system are temporarily suspended or otherwise broken.

In an exemplary implementation, a first user on a first device is located in a first physical coordinate system (e.g., the first user's physical room), and based on a first transform a user representation is located at a particular position in a XR coordinate system. Additionally, a second user on a second device is located in a second physical coordinate system (e.g., the second user's physical room), and based on a second transform a user representation for the second user is located at a particular position in the XR coordinate system. When suspend spatial truth is suspended, the first transform may be replaced with a third transform (e.g., to teleport the representation of the first user while still accounting for the first user's movement after teleportation). When spatial truth is restored, the device reverts from the third transform back to the first transform. Reverting back to the first transform may place the representation of the first user back in the same location in the XR environment. In some implementations, the representation of the first user is placed in the same position only if the first user has not moved. If the user has moved, the representation of the first user may be positioned in a new location in the XR environment based on the pre-suspension position and a change in position in the physical environment between the time suspended and restored spatial truth. For example, if the user moved a foot to the right during the suspension period, his or her representation may be positioned a foot to the right of its pre-suspension position.

In general, one innovative aspect of the subject matter described in this specification can be embodied in methods, at a first device having a processor, that include the actions of presenting, in a first presentation mode, a representation of a communication session involving multiple devices based on a position of the first device within a first physical environment and a first spatial transform between the first physical environment and the representation of the communication session, in accordance with a determination to switch the first presentation mode to a second presentation mode, presenting the representation of the communication session based on the position of the first device within the first physical environment and a second spatial transform between the first physical environment and the representation of the communication session, the second spatial transform different than the first spatial transform, and in accordance with a determination to switch the second presentation mode back to the first presentation mode, presenting the representation of the communication session based on the position of the first device within the first physical environment and the first spatial transform.

These and other embodiments can each optionally include one or more of the following features.

In some aspects, a position of a first element within the representation is based on the position of the first device in the first physical environment and the first spatial transform, and a position of a second element within the representation is based on a position of a second device in a second physical environment and a third spatial transform.

In some aspects, the method further includes, in accordance with a determination to switch to a third presentation mode, presenting the representation of the communication session based on the position of the second device within the second physical environment and a fourth spatial transform between the second physical environment and the representation of the communication session.

In some aspects, when presenting in the first presentation mode, the first element is in a first location in the representation, when switching to presenting in the second presentation mode, based on movement of the first device during presenting in the second presentation mode, the first element is moved to a second location in the representation, and when switching back to presenting in the first presentation mode, the first element is in a third location in the representation, the third location different than the first location in the representation.

In some aspects, the second spatial transform causes the first element to be positioned adjacent to the second element in the representation. In some aspects, the second spatial transform causes the first element to be positioned across from the second element in the representation.

In some aspects, visual attributes associated with the first element and the second element are altered when switching between the first presentation mode and the second presentation mode.

In some aspects, the representation further includes a plurality of other elements and the representation during the first presentation mode includes a presenter/audience mode.

In some aspects, during the presenter/audience mode, the first element is visible to a viewpoint of the second element and a plurality of viewpoints associated with each of the plurality of other elements, a visual appearance of the second element and a visual appearance of the plurality of other elements is altered with respect to a viewpoint of the first element, and the visual appearance of the second element and the visual appearance of the plurality of other elements is not visible with respect to the viewpoint of the second element and the plurality of viewpoints associated with each of the plurality of other elements.

In some aspects, the second spatial transform causes the first element to be positioned across from the second element in the representation, alters the visual appearance of the second element to be visible with respect to the viewpoint of the first element, and alters the visual appearance of the second element to be visible with respect to the plurality of viewpoints associated with each of the plurality of other elements.

In some aspects, the second presentation mode includes presenting a preview window that includes altered positions of the first element and the second element based on an expected presentation associated with the second spatial transform.

In some aspects, the determination to switch the first presentation mode to the second presentation mode is based on user input. In some aspects, the determination to switch the second presentation mode back to the first presentation mode is based on user input.

In some aspects, the representation of the communication session is presented in an extended reality (XR) experience. In some aspects, the first device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
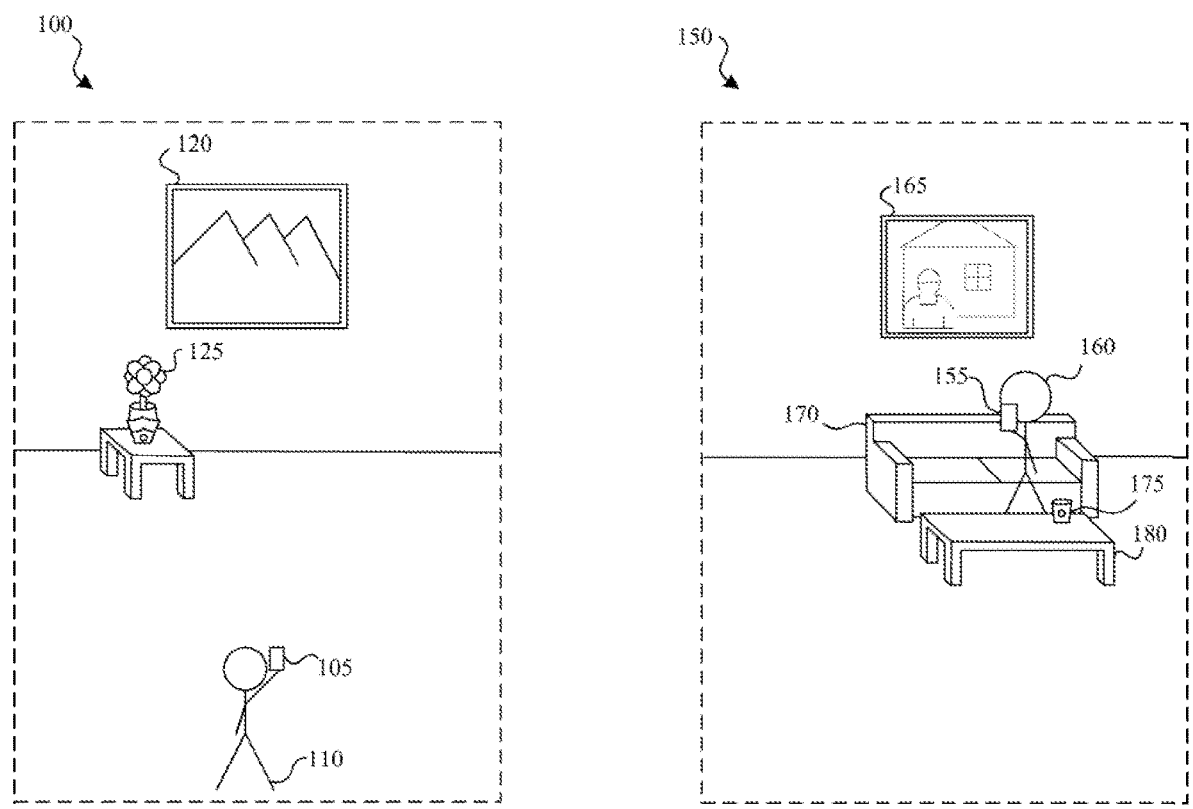
FIG. 1 illustrates exemplary electronic devices operating in different physical environments during a communication session in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates exemplary electronic devices 105, 155 operating in different physical environments 100, 150 during a communication session, e.g., while the electronic devices 105, 155 are sharing information with one another or an intermediary device such as a communication session server. In this example of FIG. 1, the physical environment 100 is a room that includes a wall hanging 120 and a vase 125 with flowers on a table. The electronic device 105 includes one or more cameras, microphones, depth sensors, or other sensors that can be used to capture information about and evaluate the physical environment 100 and the objects within it, as well as information about the user 110 of the electronic device 105. The information about the physical environment 100 and/or user 110 may be used to provide visual and audio content during the communication session. For example, a communication session may provide views to one or more participants (e.g., users 110, 160) of a 3D environment that is generated based on camera images and/or depth camera images of the physical environment 100 as well as a representation of user 110 based on camera images and/or depth camera images of the user 110.

In this example, the physical environment 150 is a room that includes a wall hanging 165, a sofa 170, and a coffee cup 175 on a coffee table 180. The electronic device 155 includes one or more cameras, microphones, depth sensors, or other sensors that can be used to capture information about and evaluate the physical environment 150 and the objects within it, as well as information about the user 160 of the electronic device 155. The information about the physical environment 150 and/or user 160 may be used to provide visual and audio content during the communication session. For example, a communication session may provide views of a 3D environment that is generated based on camera images and/or depth camera images (from electronic device 105) of the physical environment 100 as well as a representation of user 160 based on camera images and/or depth camera images (from electronic device 155) of the user 160. However, it should be noted that representations of the users 110, 160 may be provided in other 3D environments. For example, a communication session may involve representations of either or both users 110, 160 that are positioned within any entirely virtual environment or an extended reality (XR) environment that includes some physical environment representations and some virtual environment representations. Such views are illustrated in the examples of FIGS. 2-5 described next.

Figure 2:
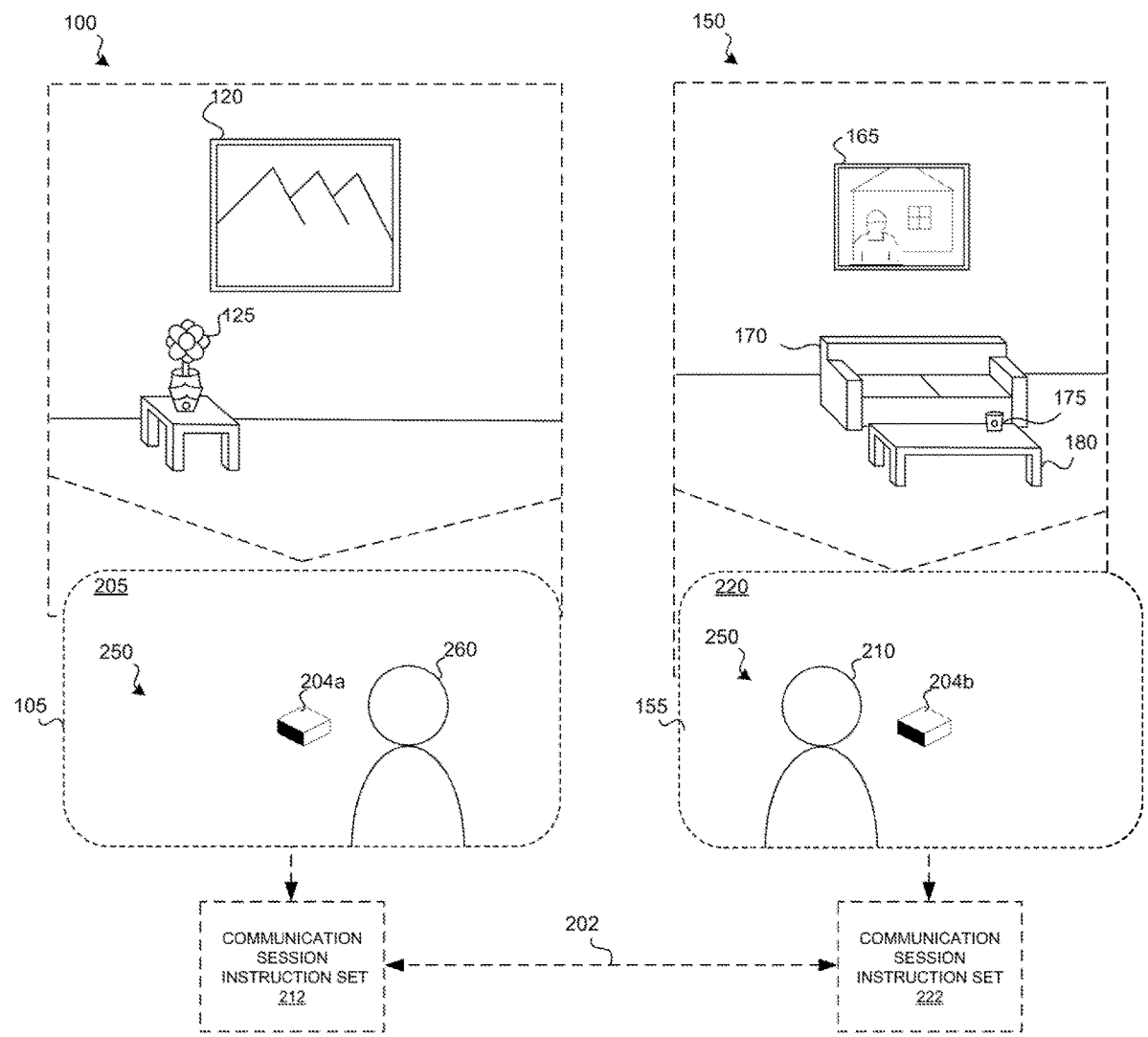
FIG. 2 illustrates exemplary views of the electronic devices of FIG. 1 during a communication session, where each view is of an extended reality (XR) environment different than the physical environment of each respective device.

FIG. 2 illustrates the exemplary electronic device 105 of FIG. 1 providing a view 205 during a communication session with electronic device 155 of FIG. 1 providing a view 220. In this example, during the communication session, the electronic device 105 provides a view 205 that enables user 110 to view a representation 260 (e.g., an avatar) of at least a portion of the user 160 (e.g., from mid-torso up) within a 3D environment 250, and the electronic device 155 provides a view 220 that enables user 160 to view a representation 210 of at least a portion of the user 110 within the same 3D environment 250 (e.g., an XR environment). In some implementations, the representation 260 of the user 160 or representation 210 of the user 110, may provide a live, real-time view of the user 160, e.g., based on sensor data including images and other sensor data of the user 160 obtained during the communication session. As the user 160 moves around, makes hand gestures, and makes facial expressions, corresponding movements, gestures, and expressions may be displayed for the representation 260 in the view 205. For example, as the user 160 moves left two feet in physical environment 150, the view 205 may show the representation 260 moving left two feet in the view 205 corresponding to the user 160 movement.

In some implementations, the 3D environment 250 is an XR environment that is based on a common coordinate system that can be shared with other users (e.g., a virtual room for avatars for a multi-person communication session).

In other words, the common coordinate system of the 3D environment 250 is different than the coordinate system of the physical environment 100 for user 110 and the physical environment 150 for user 160. The 3D environment 250 may be integrated by the device 105 by a communication session instruction set 212 in communication with the device 155 by a communication session instruction set 222 (e.g., via network connection 202). As illustrated, the 3D environment 250 includes a common reference point 204a for the view 205 and a common reference point 204b for the view 220. In some implementations, the common reference point 204 may be a virtual object within the 3D environment 250 that each user can visualize within their respective views. For example, a common center piece table that the user representations 260, 210 (e.g., the user's avatars) are positioned around within the 3D environment 250. Alternatively, the common reference point 204 is not visible within each respective view 205, 220. For example, the common coordinate system of the 3D environment 250 uses the common reference point 204 for positioning each respective user representations 260, 210. Thus, if the common reference point 204 is visible (e.g., as a coffee table), then each view of the device (e.g., views 205, 220) would be able to visualize the "center" of the 3D environment 250 for perspective when viewing other user representations. The visualization of the common reference point 204 may become more relevant with a multi-user communication session such that each user's view can add perspective to the location of each other user during the communication session.

In some implementations, the representation 260 of user 160 may be realistic or unrealistic and/or may represent a current and/or prior appearance of the user 160. For example, a photorealistic representation of the user 160 may be generated based on a combination of live images and prior images of the user. The prior images may be used to generate portions of the representation 260 for which live image data is not available (e.g., portions of a user's face that are not in view of a camera or sensor of the electronic device 155 or that may be obscured, for example, by a headset or otherwise). In one example, the electronic device 155 is a head mounted device (HMD) and live image data of the user's face includes a downward facing camera images of the user's checks and mouth and inward facing camera images of the user's eyes, which may be combined with prior image data of the user's other portions of the users face, head, and torso that cannot be currently observed from the sensors of the device 155. Prior data regarding a user's appearance may be obtained at an earlier time during the communication session, during a prior use of the electronic device, during an enrollment process used to obtain sensor data of the user's appearance from multiple perspectives and/or conditions, or otherwise.

Some implementations provide a representation of at least a portion of a user within a 3D environment other than the user's physical environment during a communication session and, based on detecting a condition, provide a representation of another object of the user's physical environment to provide context. For example, during the communication session illustrated in FIG. 2, representations of one or more other objects of the physical environment 150 may be displayed in the view 205. For example, based on determining that the user 160 is interacting with a physical object in physical environment 150, a representation (e.g., realistic or proxy) may be displayed in view 205 to provide context for the interaction of the user 160.

Figure 3A:
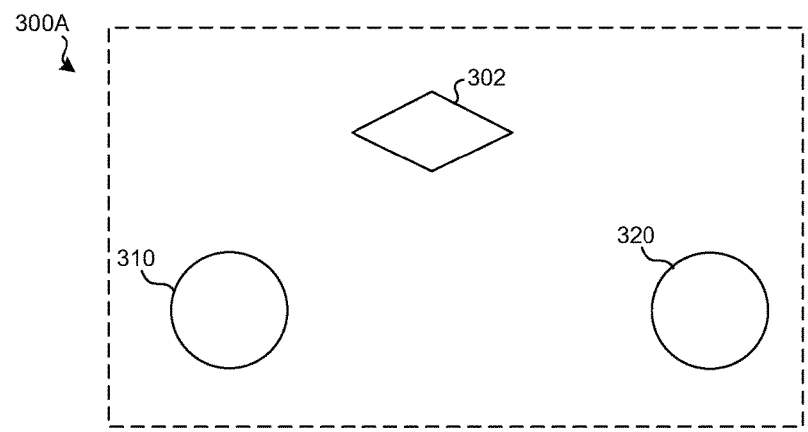
FIG. 3A illustrates an example location map based on a common coordinate system of the XR environment of FIG. 2.

FIG. 3A illustrates an example location map 300A based on a common coordinate system of the XR environment of FIG. 2. A location map illustrates a two dimensional (2D) top down view of locations of a common reference point and representations of users (or other representations of objects) within a 3D environment. In this example, during an example communication session (e.g., the communication session of FIG. 2 within the 3D environment 250), a communication session instruction set executed on an electronic device (e.g., device 105, 155), or networked through an external server, can generate a location map 300A based on the representations of the users and a common reference point 302. For example, location indicator 310 depicts a location for representation 210 of user 110, and location indicator 320 depicts a location for representation 260 of user 160 for the communication session illustrated in FIG. 2. The location map 300A further illustrates the respective placement for each user representation 210, 260, with respect to each other and with respect to the common reference point 302.

Figure 3B:
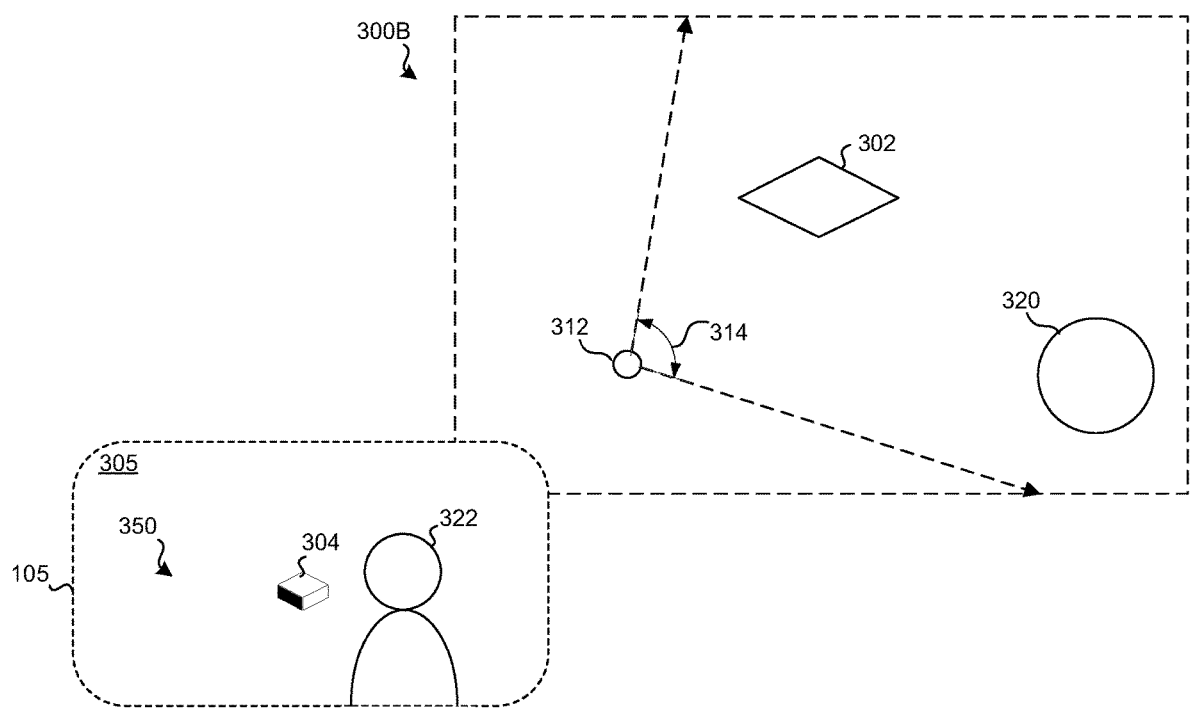
FIG. 3B illustrates an example view of a device from a user representation location on the location map of FIG. 3A.

FIG. 3B illustrates an example view of a device from a user representation location on the location map of FIG. 3A. Further, FIG. 3B illustrates the exemplary electronic device 105 of FIG. 1 providing a view 305 during a communication session. In this example, during the communication session, the electronic device 105 provides a view 305 that enables user 110 to view a representation 322 (e.g., an avatar) of at least a portion of the user 160 within a 3D environment 350. In this example, location map 300B is the same placement of the user representations and the common reference point 302 as location map 300A, however, location map 300B illustrates an example viewpoint 314 of location indicator 310. Location indicator 310 is shown as smaller in location map 300B than location map 300A for illustration purposes for depicting viewpoint 314. Thus, as shown in view 305, user 110 would see (e.g., from the perspective of location indicator 310), the representation 322 and the common reference point 304. In some implementations, as discussed herein, the common reference point 304 maybe a virtual object, such as a table, that is used as a common reference object for each user during a communication session (e.g., all of the users are positioned around a virtual table). The common reference point 304 provides a center coordinate position for the common coordinate system of the 3D environment 350. Alternatively, as discussed herein, the common reference point 304 may not be visible to the user 110 in the view 305.

Figure 4A:
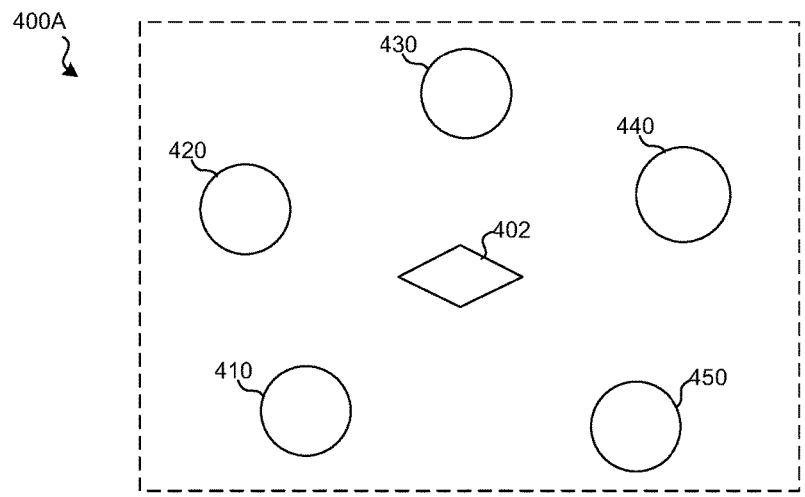
FIG. 4A illustrates an example location map based on a common coordinate system of an XR environment.

FIG. 4A illustrates an example location map 400A based on a common coordinate system of an XR environment. In this example, during an example communication session between five users, a communication session instruction set executed on each electronic device of the five users that are networked through an external server, can generate the 2D location map 400A based on the representations of the users and a common reference point 402. For example, location indicators 410, 420, 430, 440, and 450 depict a location for representations of the five different users for a multi-user communication session. The location map 400A further illustrates the respective placement for each user representation with respect to each other and with respect to the common reference point 402.

Figure 4B:
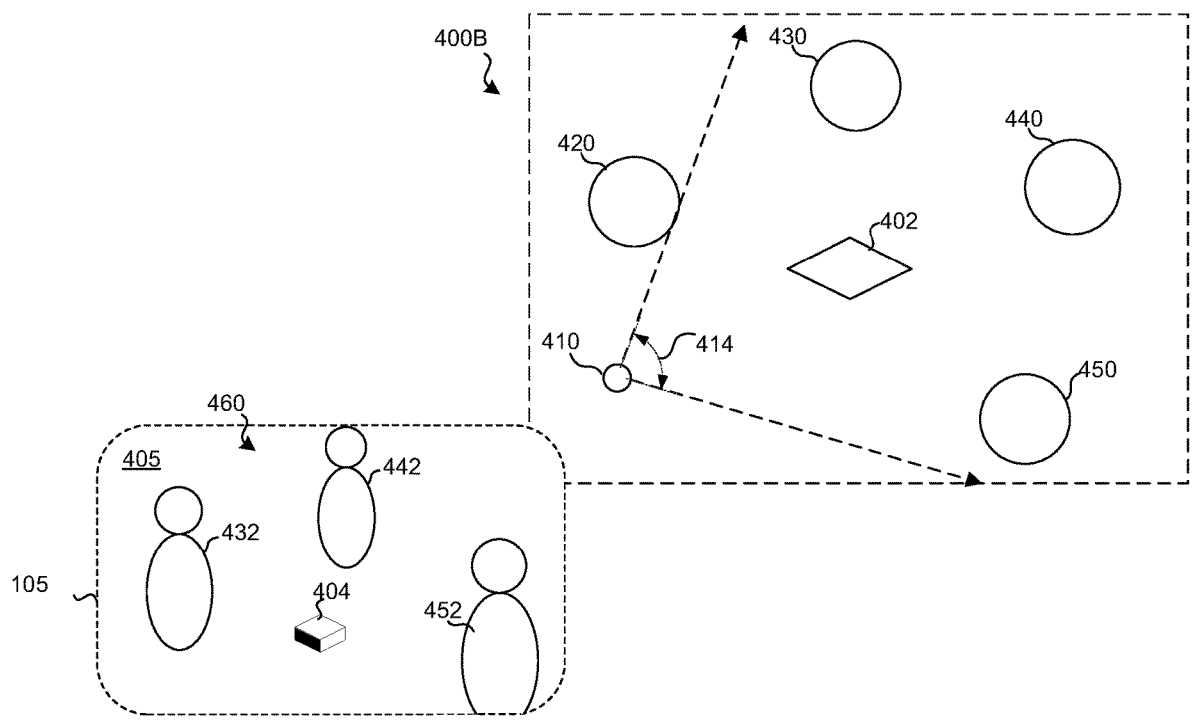
FIG. 4B illustrates an example view of a device from a user representation location on the location map of FIG. 4A.

FIG. 4B illustrates an example view of a device from a user representation location on the location map of FIG. 4A. For example, FIG. 4B illustrates the exemplary electronic device 105 of FIG. 1 providing a view 405 during a communication session with four other users. In this example, during the 5-way communication session, the electronic device 105 provides a view 405 that enables user 110 to view a representation 432 (e.g., an avatar) of at least a portion of a user associated with location indicator 430, representation 442 of at least a portion of a user associated with location indicator 440, and representation 452 of at least a portion of a user associated with location indicator 450, within a 3D environment 460. In this example, location map 400B is the same placement of the user representations and the common reference point 402 as location map 400A, however, location map 400B illustrates an example viewpoint 414 of location indicator 410. Location indicator 410 is shown as smaller in location map 400B than location map 400A for illustration purposes for depicting viewpoint 414. Thus, as shown in view 405, user 110 would see (e.g., from the perspective of location indicator 410), the representations 432, 442, and 452, and the common reference point 404. A representation associated with location indicator 420 is not within the current view of view 405, as illustrated by location map 400B of viewpoint 414. For example, the representation associated with location indicator 420 (e.g., an avatar) may not be visible to the user 110 if he or she is positioned directly to the right of the avatar, but looking further enough away such that the representation associated with location indicator 420 is out of view (e.g., directly to the left, thus can't see their avatar). In some implementations, as discussed herein, the common reference point 404 maybe a virtual object, such as a table, that is used as a common reference object for each user during a communication session (e.g., all of the five users are positioned around a virtual table). The common reference point 404 provides a center coordinate position for the common coordinate system of the 3D environment 460. Alternatively, as discussed herein, the common reference point 404 may not be visible to the user 110 in the view 405.

Figure 5:
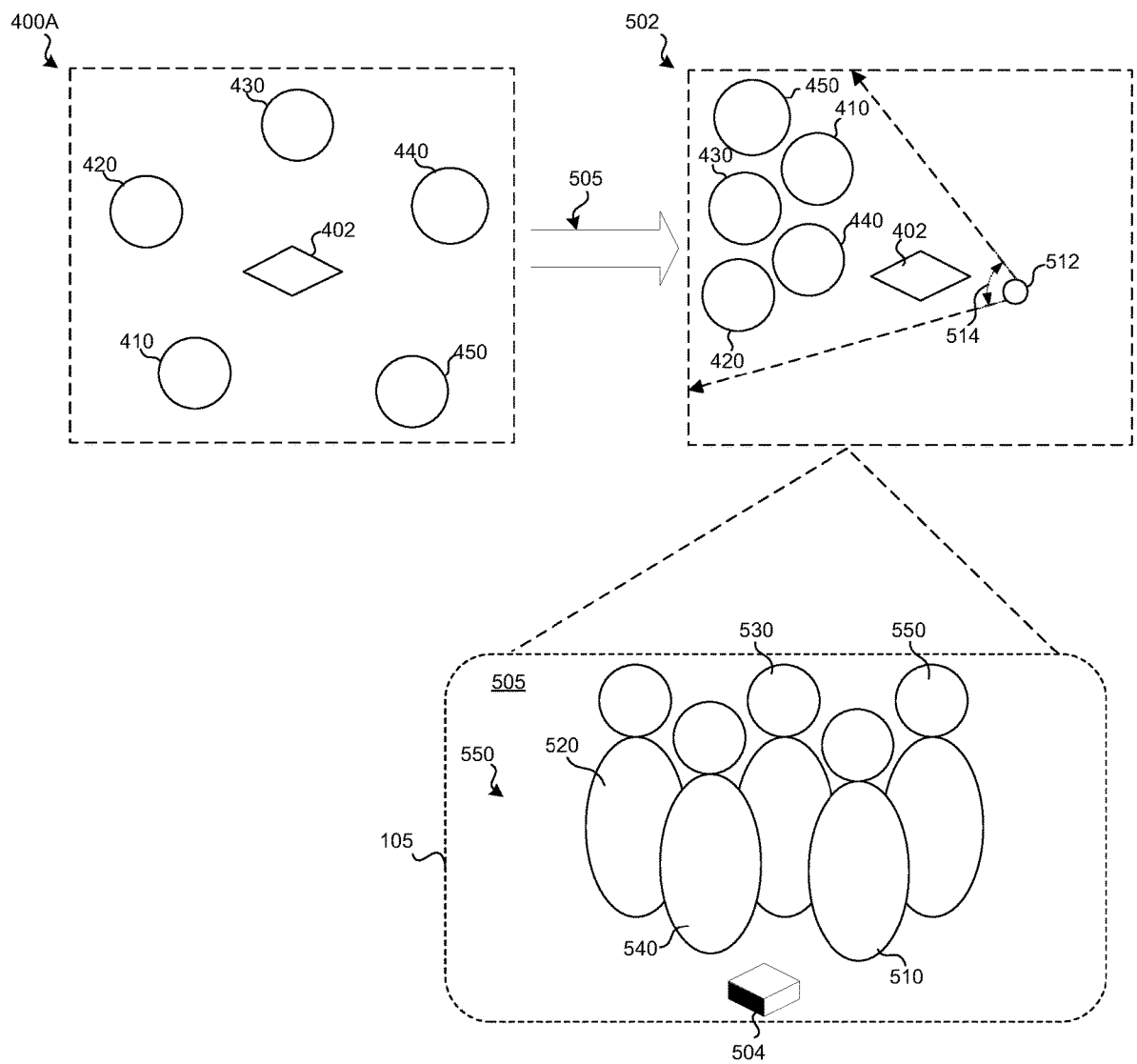
FIG. 5 illustrates an example view of a device from a user representation location on a location map of an XR environment after temporarily suspending spatial constraints of the XR environment.

FIG. 5 illustrates an example view of a device from a user representation location on a location map of an XR environment after temporarily suspending spatial constraints of the XR environment. In particular, FIG. 5 illustrates an example of temporarily suspending spatial constraints to enable a group "selfie" picture during a multi-user communication session without requiring the users move their avatars closer to one another. Spatial constraints (also referred to herein as spatial truth) refers to a requirement in an XR experience that relative positioning between content elements and their relative movement over time be the same for all users participating in a multi-user communication session. Based on a determination to temporarily suspend spatial truth for each user representation (e.g., a user desires a group selfie of each avatar, two users want to break away for a one-on-one direct messaging, etc.), the representations of the users may be able to be temporarily moved closer to one another (e.g., teleportation). For example, when a user is teleported next to another user (e.g., to take a selfie), both users have the same (consistent) view of the XR environment both before and after the teleportation. The teleportation breaks the transform between the user's physical environment coordinate system and the common coordinate system in the XR environment.

In this example, FIG. 5 illustrates the example multi-user communication session for five users of FIGS. 4A and 4B. For example, the location map 400A is shown as being altered into location map 502 based on an interaction feature 505 (e.g., a user selects a group "selfie" mode). Thus, following the action from the interaction feature 505, the location map 502 illustrates the location indicators 410, 420, 430, 440, and 450 at different locations for representations of the five different users for a multi-user communication session (e.g., ready for a "selfie" mode). The location map 502 further illustrates the respective updated placement for each user representation with respect to each other and with respect to the common reference point 402.

FIG. 5 further illustrates the exemplary electronic device 105 of FIG. 1 providing a view 505 while presenting a selfie mode during a communication session with four other users. In this example, during the 5-way communication session, the electronic device 105 provides a view 505 that enables a user to view each representation 510, 520, 530, 540, and 550 associated with location indicators 410, 420, 430, 440, and 450, respectively, within a 3D environment 550. In this example (e.g., during a group selfie mode), location map 502 illustrates an example viewpoint 514 of location indicator 512 (e.g., a virtual representation of a location of a camera). Thus, as shown in view 505, a user would see (e.g., from the perspective of location indicator 512—the camera view), the representations 510, 520, 530, 540, and 550, and the common reference point 504. The view 505 would therefore also include a view of the user's own representation (e.g., user 110 would see their own user representation 510). In some implementations, as discussed herein, the common reference point 504 maybe a virtual object, such as a table, that is used as a common reference object for each user during a communication session (e.g., all of the five users are positioned around a virtual table). Therefore, during capture of the group selfie, a virtual object associated with common reference point 504 may be captured in the selfie photo. Alternatively, as discussed herein, the common reference point 504 may not be visible in the view 505, thus would not be included in the group selfie image.

In some implementations, the view 505 is a preview mode. For example, a user may select to show a preview of what a group selfie would possibly look like if a preview mode is selected.

In the example of FIGS. 1-5, the electronic devices 105, 155 are illustrated as hand-held devices. The electronic devices 105, 155 may be a mobile phone, a tablet, a laptop, so forth. In some implementations, electronic devices 105, 155 may be worn by a user. For example, electronic devices 105, 155 may be a watch, a head-mounted device (HMD), head-worn device (glasses), headphones, an ear mounted device, and so forth. In some implementations, functions of the devices 105, 155 are accomplished via two or more devices, for example a mobile device and base station or a head mounted device and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 105, 155 may communicate with one another via wired or wireless communications.

According to some implementations, the electronic devices 105, 155 generate and present an extended reality (XR) environment to one or more users during a communication session. In contrast to a physical environment that people can sense and/or interact with without aid of electronic devices, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 6:
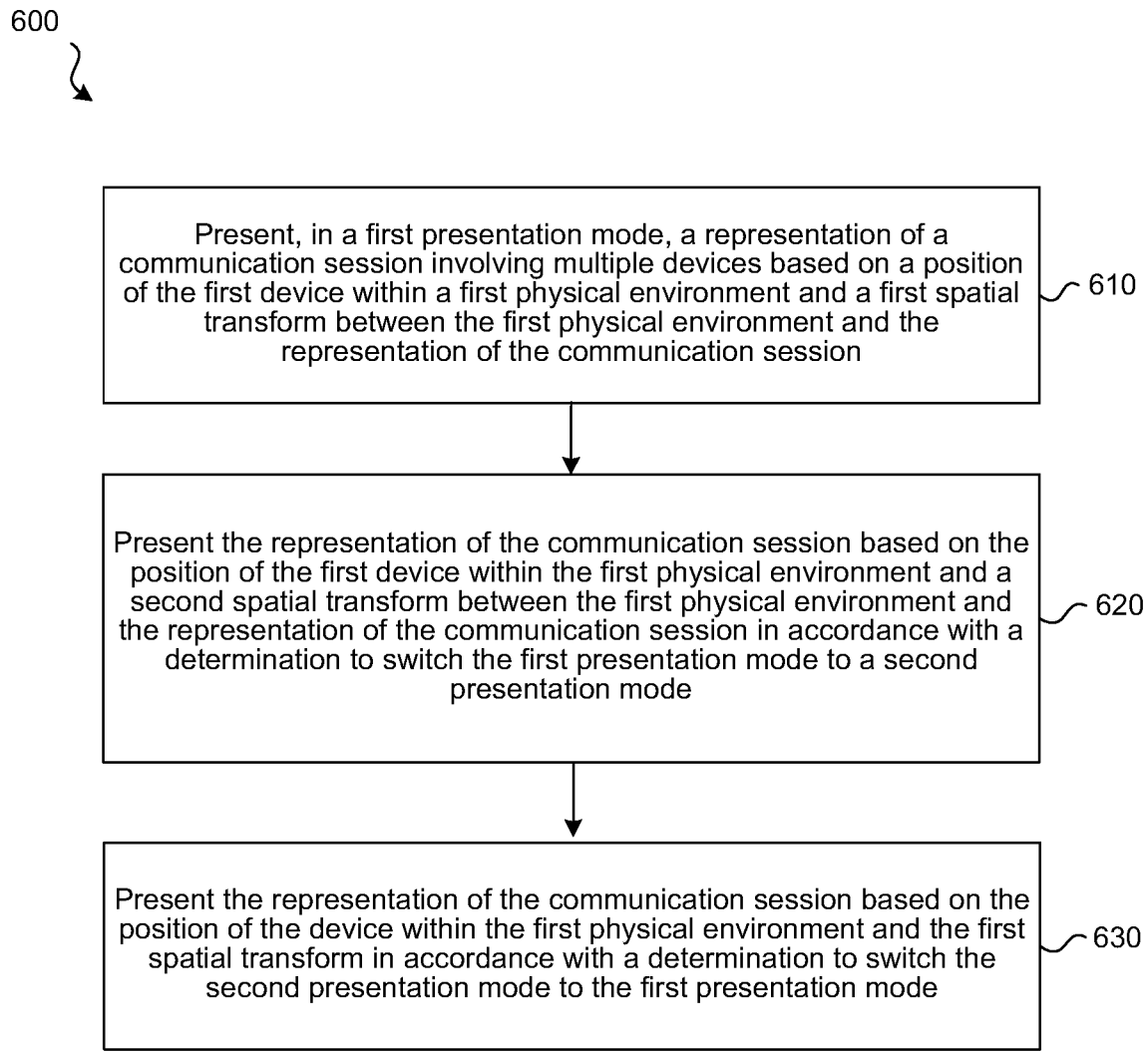
FIG. 6 is a flowchart illustrating a method for providing a representation of a communication session and switching between presentation modes based on a spatial transform in accordance with some implementations.

FIG. 6 is a flowchart illustrating a method 600 for presenting a representation of a communication session involving multiple devices in different presentation modes based on spatial transforms between a physical environment and the representation of the communication session. In some implementations, a device, such as electronic device 105 or electronic device 155, or a combination of the two, performs method 600. In some implementations, method 600 is performed on a mobile device, desktop, laptop, HMD, ear-mounted device or server device. The method 600 is performed by processing logic, including hardware, firmware, software, or a combination thereof. In some implementations, the method 600 is performed on a processor executing code stored in a non-transitory computer-readable medium (e.g., a memory).

At block 610, the method 600 presents, in a first presentation mode, a representation of a communication session involving multiple devices based on a position of the first device within a first physical environment and a first spatial transform between the first physical environment and the representation of the communication session. For example, as illustrated in FIG. 2, electronic device 105 (within physical environment 100) is presented a view 205 of a communication session and is a particular location within the 3D environment 250 based on a common coordinate system of the 3D environment 250. The first spatial transform would be the transform between the user's physical environment coordinate system and the common coordinate system of the shared 3D environment 250. Spatial truth may be based on a common reference point or a common coordinate system to define the relative positions of elements (e.g., based on a common reference point, such as common reference point 204).

In some implementations, the representation includes a first element (e.g., a representation of a first user, such as a first avatar) and a second element (e.g., a representation of a second user, such as a second avatar). In some implementations, the representation of the communication session (e.g., 3D environment 250) is presented as an XR experience.

At block 620, the method 600 presents the representation of the communication session based on the position of the first device within the first physical environment and a second spatial transform between the first physical environment and the representation of the communication session in accordance with a determination to switch the first presentation mode to a second presentation mode, where the second spatial transform is different than the first spatial transform. For example, a user selects a selfie mode, a direct message (DM) mode, ask questions during a presentation, and the like. The second presentation mode based on the second spatial transform may include repositioning the avatars for a group selfie (e.g., FIG. 5), a preview window of altered positions, an avatar leaving the communication session (become blobs), a side conversation involving 2 of 5 avatars in a bubble, an audience member asking question is temporarily positioned on stage rather than in audience space, and the like In some implementations, the second spatial transform temporarily breaks the spatial truth of the first spatial transform. For example, the second spatial transform may be defined in advance based on some pre-set positions and/or arrangements of users that the associated representations (e.g., avatars) can temporarily "move" to (e.g., for a group selfie). For example, in a selfie presentation mode, the user that initiated the selfie can maintain his or her spatial truth, such that any static content in that selfie (e.g., objects in the background) remain where the user believes the static content should be. In some implementations, a selfie template may be used to define relative placements of the representatives of the additional participants around the initiator of that selfie. For example, as illustrated in FIG. 5, a second user representation (e.g., representation 540) is added to the right of the initiator (e.g., representation 510). Then a third user representation (e.g., representation 550) is added to the left and behind of the initiator, and so forth. Thus, those participants (e.g., representations 520, 530, 540, 550) would have their spatial truth temporarily suspended so that they can be placed in those new positions facing the camera. In a different presentation mode, for example, in a theater audience mode (e.g., watching a 3D movie), where each person actually has the best view, the second spatial transform may break spatial truth to show the user representations in other seats.

In some implementations, the determination to switch the first presentation mode to the second presentation mode is based on user input. For example, a user may select a selfie mode, a side conversation (e.g., direct messaging) mode, ask a question during a presentation, and the like. In some implementations, as inputs, a number of participants currently in a communication session may be relevant. For example, a communication session application could choose different layouts based on number of people. Additionally, or alternatively, the user input may include moving his or her device in a particular direction or motion (e.g., the user is holding the device as a selfie camera or making a motion to show selfie camera mode).

In some implementations, the second spatial transform causes the first element to be positioned adjacent to the second element in the representation. For example, if a user wants a side conversation with another user, he or she can select a DM mode. The second spatial transform may temporarily suspend the spatial constraints of the two representations of users in the communication session and place them next to each other. Alternatively, the two representations of users may be placed in a separate 3D environment so that the users can participate in a one-on-one communication session away from any other user in the initial communication session. In some implementations, the second spatial transform causes the first element to be positioned across from the second element in the representation. For example, the DM mode may initiate a face-to-face video chat.

In some implementations, the elements (e.g., the user representations as avatars) are shown as "blobs", faded, etc., to remaining users during the spatial transform. For example, visual attributes associated with the first element and the second element may be altered (e.g., blurred/blob) when switching between the first presentation mode and the second presentation mode, and vice versa. The visual attributes may be visible for a viewpoint of a third device. For example, when two users interact in a direct messaging session, a third user on a third device in the multi-user communication session, may see the avatars of the two user in the direct messaging session as blurred out or faded, which may indicate to the third user that those two users are not available to interact with at that time during multi-user communication session. Then, when the direct messaging session has ended, then the visual attributes of the two user's avatars may be restored such that the third user can then interact with them again if desired.

In some implementations, the second presentation mode includes presenting a preview window (e.g., a preview mode) that includes altered positions of the first element and the second element based on an expected presentation associated with the second spatial transform.

At block 630, the method 600 presents the representation of the communication session based on the position of the device within the first physical environment and the first spatial transform in accordance with a determination to switch the second presentation mode back to the first presentation mode. For example, the elements (e.g., user representations or avatars) return to their prior relative positions in the first presentation mode. For example, the DM session ended, so the two user avatars return to the multiuser session.

In some implementations, a position of a first element within the representation is based on the position of the first device in the first physical environment and the first spatial transform, and a position of a second element within the representation is based on a position of a second device in a second physical environment and a third spatial transform. For example, as illustrated in FIG. 2, the electronic device 105 provides a view 205 that enables user 110 to view a representation 260 (e.g., an avatar) of at least a portion of the user 160 (e.g., from mid-torso up) within a 3D environment 250, and the electronic device 155 provides a view 220 that enables user 160 to view a representation 210 of at least a portion of the user 110 within the same 3D environment 250 (e.g., an XR environment).

In some implementations, the method 600 presents the representation of the communication session based on the position of the second device within the second physical environment and a fourth spatial transform between the second physical environment and the representation of the communication session in accordance with a determination to switch to a third presentation mode. For example, a user selects the selfie mode, a side conversation/DM mode, ask question during a presentation, etc., after the second presentation mode (e.g., switches to a selfie mode, then switches to a DM mode).

In some implementations, the first object in the first location in the representation while in a first mode, the first object in a second location in the representation when switching to a second mode, location changes in response to movement of the device while in the second mode, and location isn't the same when you switch back to first mode. For example, the method 600 may further include when presenting in the first presentation mode, the first element is in a first location in the representation, when switching to presenting in the second presentation mode, based on movement of the device during presenting in the second presentation mode, the first element is moved to a second location in the representation, and when switching back to presenting in the first presentation mode, the first element is in a third location in the representation, the third location different than the first location in the representation.

In some implementations, avatars may be repositioned during a presentation. For example, the multi-user communication session may include a presenter and an audience, where an audience member asking a question is temporarily positioned on stage rather than in an audience space (e.g., spatial constraints are temporarily suspended). In an exemplary implementation, the representation further includes a plurality of other elements (e.g., other audience avatars), and the representation during the first presentation mode includes a presenter/audience mode. During the presenter/audience mode, the first element (e.g., a lecturer) is visible to a viewpoint of the second element and a plurality of viewpoints associated with each of the plurality of other elements, a visual appearance of the second element and a visual appearance of the plurality of other elements (e.g., the audience members) is altered with respect to a viewpoint of the first element, and (e.g., blurred, faded, or not visible) the visual appearance of the second element and the visual appearance of the plurality of other elements is not visible with respect to the viewpoint of the second element and the plurality of viewpoints associated with each of the plurality of other elements. In some implementations, the second spatial transform causes the first element to be positioned across from the second element in the representation, alters the visual appearance of the second element to be visible with respect to the viewpoint of the first element, and alters the visual appearance of the second element to be visible with respect to the plurality of viewpoints associated with each of the plurality of other elements.

In some implementations, during a theater experience (e.g., watching a 3D movie), transitioning to the second spatial transform (e.g., breaking spatial truth) may allow the system to show a first user something happening to another participant that doesn't reflect the other participant's actual movements (e.g., breaking spatial truth). A theater viewing mode may allow all viewers to always see 3D content from a perspective based on where they are located. For example, as part of a theater experience, the first user may see (e.g., from a movie screen) a wave of water heading toward the other participant, but an application may temporarily suspend spatial truth to enhance this experience, such that the other participant (e.g., the person sitting next to the first user) is always placed such that the water appears to flow between each person. For example, the water coming out of the screen may flow towards the middle of the theater, such that if you were on the left side of the theater it would pass by you on the right, or if you were on the right side of the theater it would pass by you on the left. In some implementations, even if the other participant tries move in front of the water, the first user wouldn't see the other participant [[move?]]. In some implementations, breaking spatial truth in a theater viewing mode may allow each user to see the 3D content in a way that is inconsistent with the way other users view the content, such as by letting the wave of water flow directly toward each viewer or to narrowly miss each viewer to their right side in order to enhance the experience of the content.

Figure 7:
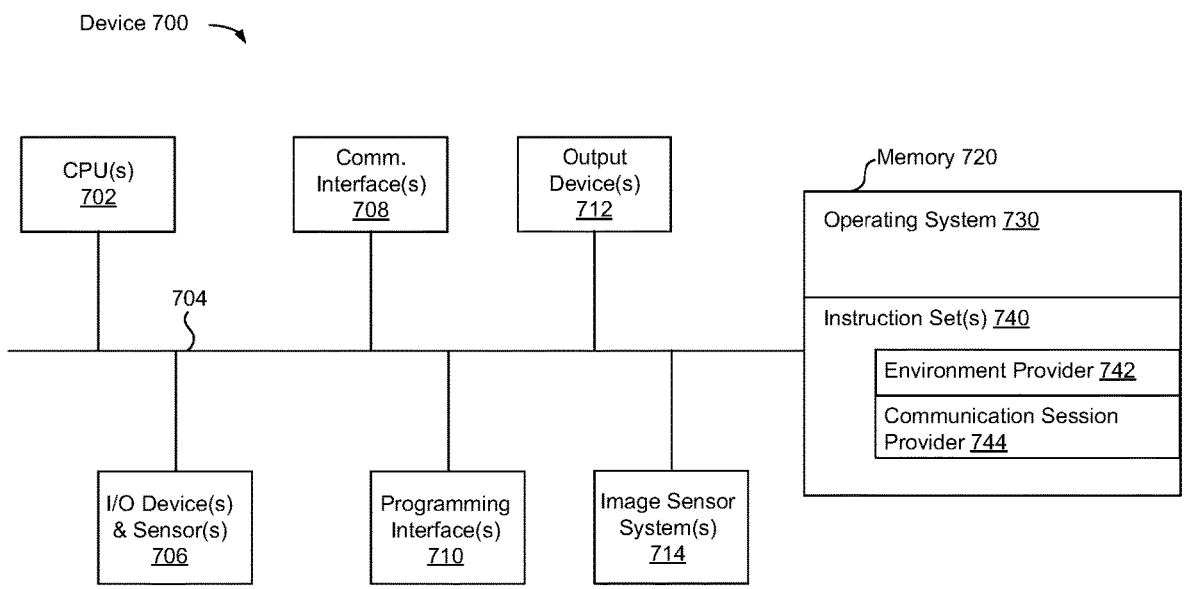
FIG. 7 is a block diagram of an electronic device of in accordance with some implementations.

FIG. 7 is a block diagram of electronic device 700. Device 700 illustrates an exemplary device configuration for electronic device 105 or electronic device 155. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more output device(s) 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 712 include one or more displays configured to present a view of a 3D environment to the user. In some implementations, the one or more output device(s) 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 700 includes a single display. In another example, the device 700 includes a display for each eye of the user.

In some implementations, the one or more output device(s) 712 include one or more audio producing devices. In some implementations, the one or more output device(s) 712 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 712 may additionally or alternatively be configured to generate haptics.

In some implementations, the one or more image sensor systems 714 are configured to obtain image data that corresponds to at least a portion of a physical environment. For example, the one or more image sensor systems 714 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include an environment provider instruction set 742 configured to, upon execution, provide a view of a 3D environment, for example, during a communication session, as described herein. The instruction set(s) 740 further include a communication session provider instruction set 744 configured to, upon execution, determine to provide a communication session within a view of a 3D environment as described herein. The instruction set(s) 740 may be embodied as a single software executable or multiple software executables.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a first device having a processor:
presenting, in a first presentation mode, a representation of a communication session in an extended reality (XR) experience, wherein the communication session comprises multiple devices that are communicatively connected and are positioned within the representation of the communication session based on a common coordinate system, wherein the first device is positioned within the common coordinate system based on a position of the first device within a first physical environment and a first spatial transform between a coordinate system of the first physical environment and the common coordinate system of the representation of the communication session, wherein a position of a first element within the representation is based on the position of the first device in the first physical environment and the first spatial transform, and wherein a position of a second element within the representation is based on a position of a second device in a second physical environment and a third spatial transform;
determining to switch the first presentation mode to a second presentation mode;
presenting, in the second presentation mode, the representation of the communication session based on the position of the first device within the first physical environment and a second spatial transform between the first physical environment and the representation of the communication session, the second spatial transform different than the first spatial transform;
determining to switch the second presentation mode back to the first presentation mode; and
presenting, in the first presentation mode, the representation of the communication session based on the position of the first device within the first physical environment and the first spatial transform, wherein:
when presenting in the first presentation mode, the first element is in a first location in the representation:
when switching to presenting in the second presentation mode, based on movement of the first device during presenting in the second presentation mode, the first element is moved to a second location in the representation; and
when switching back to presenting in the first presentation mode, the first element is in a third location in the representation, and the third location is different than the first location in the representation.

2. The method of claim 1, further comprising:
determining to switch to a third presentation mode; and
presenting the representation of the communication session based on the position of the second device within the second physical environment and a fourth spatial transform between the second physical environment and the representation of the communication session.

3. The method of claim 1, wherein the second spatial transform causes the first element to be positioned adjacent to the second element in the representation.

4. The method of claim 1, wherein the second spatial transform causes the first element to be positioned across from the second element in the representation.

5. The method of claim 1, wherein visual attributes associated with the first element and the second element are altered when switching between the first presentation mode and the second presentation mode.

6. A method comprising:
at a first device having a processor:
presenting, in a first presentation mode, a representation of a communication session in an extended reality (XR) experience, wherein the communication session comprises multiple devices that are communicatively connected and are positioned within the representation of the communication session based on a common coordinate system, wherein the first device is positioned within the common coordinate system based on a position of the first device within a first physical environment and a first spatial transform between a coordinate system of the first physical environment and the common coordinate system of the representation of the communication session, wherein a position of a first element within the representation is based on the position of the first device in the first physical environment and the first spatial transform, and wherein a position of a second element within the representation is based on a position of a second device in a second physical environment and a third spatial transform;
determining to switch the first presentation mode to a second presentation mode;
presenting, in the second presentation mode, the representation of the communication session based on the position of the first device within the first physical environment and a second spatial transform between the first physical environment and the representation of the communication session, the second spatial transform is different than the first spatial transform;
determining to switch the second presentation mode back to the first presentation mode; and
presenting, in the first presentation mode, the representation of the communication session based on the position of the first device within the first physical environment and the first spatial transform,
wherein the representation further comprises a plurality of other elements and the representation during the first presentation mode comprises a presenter/audience mode.

7. The method of claim 6, wherein, during the presenter/audience mode:
the first element is visible to a viewpoint of the second element and a plurality of viewpoints associated with each of the plurality of other elements;
a visual appearance of the second element and a visual appearance of the plurality of other elements is altered with respect to a viewpoint of the first element; and the visual appearance of the second element and the visual appearance of the plurality of other elements is not visible with respect to the viewpoint of the second element and the plurality of viewpoints associated with each of the plurality of other elements.

8. The method of claim 7, wherein the second spatial transform:
   causes the first element to be positioned across from the second element in the representation;
   alters the visual appearance of the second element to be visible with respect to the viewpoint of the first element; and
   alters the visual appearance of the second element to be visible with respect to the plurality of viewpoints associated with each of the plurality of other elements.

9. The method of claim 1, wherein the second presentation mode comprises presenting a preview window that includes altered positions of the first element and the second element based on an expected presentation associated with the second spatial transform.

10. The method of claim 1, wherein determining to switch the first presentation mode to the second presentation mode is based on user input.

11. The method of claim 1, wherein determining to switch the second presentation mode back to the first presentation mode is based on user input.

12. The method of claim 1, wherein the first device is a head-mounted device (HMD).

13. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the one or more processors to perform operations comprising:
      presenting, in a first presentation mode, a representation of a communication session in an extended reality (XR) experience, wherein the communication session comprises multiple devices that are communicatively connected and are positioned within the representation of the communication session based on a common coordinate system, wherein a first device is positioned within the common coordinate system based on a position of the first device within a first physical environment and a first spatial transform between a coordinate system of the first physical environment and the common coordinate system of the representation of the communication session, wherein a position of a first element within the representation is based on the position of the first device in the first physical environment and the first spatial transform, and wherein a position of a second element within the representation is based on a position of a second device in a second physical environment and a third spatial transform;
      determining to switch the first presentation mode to a second presentation mode;
      presenting, in the second presentation mode, the representation of the communication session based on the position of the first device within the first physical environment and a second spatial transform between the first physical environment and the representation of the communication session, the second spatial transform different than the first spatial transform;
      determining to switch the second presentation mode back to the first presentation mode; and
      presenting, in the first presentation mode, the representation of the communication session based on the position of the first device within the first physical environment and the first spatial transform, wherein:
         when presenting in the first presentation mode, the first element is in a first location in the representation;
         when switching to presenting in the second presentation mode, based on movement of the first device during presenting in the second presentation mode, the first element is moved to a second location in the representation; and
         when switching back to presenting in the first presentation mode, the first element is in a third location in the representation, the third location different than the first location in the representation.

14. The system of claim 13, wherein the program instructions, when executed on the one or more processors, further cause the one or more processors to perform operations comprising:
   determining to switch to a third presentation mode; and
   presenting the representation of the communication session based on the position of the second device within the second physical environment and a fourth spatial transform between the second physical environment and the representation of the communication session.

15. The system of claim 13, wherein the second spatial transform causes the first element to be positioned adjacent to the second element in the representation.

16. A non-transitory computer-readable storage medium storing program instructions executable via one or more processors to perform operations comprising:
   presenting, in a first presentation mode, a representation of a communication session in an extended reality (XR) experience, wherein the communication session comprises multiple devices that are communicatively connected and are positioned within the representation of the communication session based on a common coordinate system, wherein a first device is positioned within the common coordinate system based on a position of the first device within a first physical environment and a first spatial transform between a coordinate system of the first physical environment and the common coordinate system of the representation of the communication session, wherein a position of a first element within the representation is based on the position of the first device in the first physical environment and the first spatial transform, and wherein a position of a second element within the representation is based on a position of a second device in a second Physical environment and a third spatial transform;
   determining to switch the first presentation mode to a second presentation mode;
   presenting, in the second presentation mode, the representation of the communication session based on the position of the first device within the first physical environment and a second spatial transform between the first physical environment and the representation of the communication session, the second spatial transform different than the first spatial transform;
   determining to switch the second presentation mode back to the first presentation mode; and
   presenting, in the first presentation mode, the representation of the communication session based on the position of the first device within the first physical environment and the first spatial transform, wherein:

when presenting in the first presentation mode, the first element is in a first location in the representation;

when switching to presenting in the second presentation mode, based on movement of the first device during presenting in the second presentation mode, the first element is moved to a second location in the representation; and when switching back to presenting in the first presentation mode, the first element is in a third location in the representation, the third location different than the first location in the representation.

\* \* \* \* \*